United States Patent
Koh (10) Patent No.: US 11,205,970 B2
(45) Date of Patent: Dec. 21, 2021

(54) GRID-CONNECTED INVERTER SYSTEM

(71) Applicant: LS ELECTRIC CO., LTD., Anyang-si (KR)

(72) Inventor: Kwang-Soo Koh, Anyang-si (KR)

(73) Assignee: LS ELECTRIC CO., LTD., Anyang-si (KR)

(*) Notice: Subject to any disclaimer, the term of this patent is extended or adjusted under 35 U.S.C. 154(b) by 0 days.

(21) Appl. No.: 16/960,209

(22) PCT Filed: Jan. 11, 2019

(86) PCT No.: PCT/KR2019/000434
§ 371 (c)(1),
(2) Date: Jul. 6, 2020

(87) PCT Pub. No.: WO2019/156373
PCT Pub. Date: Aug. 15, 2019

(65) Prior Publication Data
US 2021/0067055 A1 Mar. 4, 2021

(30) Foreign Application Priority Data
Feb. 9, 2018 (KR) .......... 10-2018-0016355

(51) Int. Cl.
*H02M 7/493* (2007.01)
*H02J 3/32* (2006.01)
(Continued)

(52) U.S. Cl.
CPC .......... *H02M 7/493* (2013.01); *H02J 3/32* (2013.01); *H02J 3/38* (2013.01); *H02J 15/00* (2013.01);
(Continued)

(58) Field of Classification Search
CPC .................................. H02M 7/493
See application file for complete search history.

(56) References Cited

U.S. PATENT DOCUMENTS

| 7,586,766 B2 * | 9/2009 | Ikeda | H02J 1/102 363/142 |
| 8,779,716 B2 * | 7/2014 | Fotherby | H02M 1/44 318/800 |

(Continued)

FOREIGN PATENT DOCUMENTS

| JP | 2001016859 A | 1/2001 |
| KR | 101369692 B1 | 3/2014 |

(Continued)

OTHER PUBLICATIONS

International Search Report for related International Application No. PCT/KR2019/000434; report dated Aug. 15, 2019; (5 pages).

(Continued)

*Primary Examiner* — Alex Torres-Rivera
(74) *Attorney, Agent, or Firm* — K&L Gates LLP (57) ABSTRACT

The grid-connected inverter system according to one embodiment of the present invention may convert direct current supplied from a direct current source into alternating current, receive a control command from an upper level controller and a power electronics building block group comprising a plurality of power electronics building blocks for supplying the converted alternating current to a grid, determine the number of power electronics building blocks which will operate according to the control command, and transmit a control signal for operating the determined number of power electronics building blocks to corresponding power electronics building blocks.

15 Claims, 10 Drawing Sheets

(51) Int. Cl.
*H02J 3/38* (2006.01)
*H02J 15/00* (2006.01)
*H02M 7/53862* (2007.01)

(52) U.S. Cl.
CPC ..... *H02M 7/53862* (2013.01); *H02J 2300/24* (2020.01)

(56) References Cited

U.S. PATENT DOCUMENTS

| | | | | |
|---|---|---|---|---|
| 2011/0194319 | A1* | 8/2011 | Ishioka | H02M 7/493 363/71 |
| 2011/0273011 | A1* | 11/2011 | de Wergifosse | H02M 7/493 307/9.1 |
| 2013/0088900 | A1* | 4/2013 | Park | H02J 3/381 363/71 |
| 2014/0119069 | A1* | 5/2014 | Bae | H02M 7/493 363/41 |
| 2015/0016161 | A1* | 1/2015 | Tanaka | H02M 7/44 363/71 |
| 2017/0047742 | A1* | 2/2017 | Narla | H02J 7/007 |
| 2017/0163165 | A1* | 6/2017 | Ramamurthy | H02M 7/493 |

FOREIGN PATENT DOCUMENTS

| | | |
|---|---|---|
| KR | 20150135653 A | 12/2015 |
| KR | 20170009585 A | 1/2017 |
| KR | 20170112063 A | 10/2017 |

OTHER PUBLICATIONS

Written Opinion for related International Application No. PCT/KR2019/000434; report dated Aug. 15, 2019; (5 pages).

* cited by examiner

GRID-CONNECTED INVERTER SYSTEM

CROSS-REFERENCE TO RELATED APPLICATIONS

The present application is a National Stage of International Application No. PCT/KR2019/000434, filed on Jan. 11, 2019, which claims the benefit of earlier filing date and right of priority to Korean Application No. 10-2018-0016355 filed on Feb. 9, 2018, the contents of which are all hereby incorporated by reference herein in their entirety.

FIELD OF THE INVENTION

The present disclosure relates to a grid-connected inverter system.

BACKGROUND OF THE INVENTION

A grid-connected inverter system includes an energy storage system (ESS), a solar system, a wind power system, and a fuel cell system.

Energy storage provides power to a grid through a battery, and stores excessive power of the grid into the battery.

Power generated from renewable energy may be supplied to the grid to improve stability of the grid or to improve supply reliability of the grid. The grid-connected inverter system charges active power when a frequency of power rises up due to load fluctuations at a consumer or a substation. When the frequency thereof decreases due to load fluctuations at a consumer or a substation, the grid-connected inverter system discharges active power. In this way, the frequency of the power may be controlled.

Further, the grid-connected inverter system may act as a reactive power compensation device that suppresses power factor variation, prevents instantaneous voltage variation, and operates as an active filter to remove harmonics.

The grid-connected inverter system performs dynamic grid support and static grid support to prevent grid accident spreading and grid stabilization in a distributed power system. The dynamic grid support is a requirement for FRT (Fault Ride Through). The static grid support is related to active/reactive power and must supply reactive power in a depending manner on fixed reactive power or fixed power factor, fixed grid voltage or fixed active power.

The grid-connected inverter system mainly converts power in both directions using an IGBT (Insulated Gate Bipolar Transistor) element, and applies a filter to an alternating current (AC) terminal to remove a ripple component of an output current.

The grid-connected inverter system is composed of a direct current (DC) power source, a power conversion system (PCS), a system controller, and a grid, and requires HMI (Human Machine Interface) or a power monitoring device.

However, a conventional grid-connected inverter system is configured to operate one power conversion device or a plurality of power conversion devices using one power supply.

In this case, a certain amount of power must be continuously provided to a system controller for operating the power conversion device even when the power conversion device is not operated.

That is, in order that the system controller receives a control command from a higher controller and immediately responds thereto, the system controller needs to be supplied with power even in a standby situation. Thus, a method for reducing power consumption in the standby state is needed.

BRIEF SUMMARY OF THE INVENTION

A purpose of the present disclosure is to provide a grid-connected inverter system capable of minimizing consumption of standby power in a standby mode where a power conversion device is not operating.

In one aspect of the present disclosure, a grid-connected inverter system may include a power electronics building block group including a plurality of power electronics building blocks, wherein each power electronics building block is configured to direct current (DC) power supplied from a DC power source is converted to alternating current (AC) power, and to supply the converted AC power to a grid; and a master controller configured to: receive a control command from a higher controller; determine a number of power electronics building blocks to be activated, based on the control command; and transmit a control signal triggering operations of the determined number of the power electronics building blocks thereto.

The plurality of power electronics building blocks may be connected with each other in a parallel manner, wherein each of the plurality of power electronics building blocks may be able to operate independently.

The power electronics building block group may include a plurality of switched-mode power supplies and a plurality of relay modules corresponding to the plurality of power electronics building blocks, respectively, wherein the master controller may be configured to transmit a turn-on signal to each of relay modules corresponding to the determined number of the power electronics building blocks, respectively.

When each relay module is turned on in response to reception of the turn-on signal, each switched-mode power supply corresponding thereto may supply control power to each power electronics building block corresponding thereto.

The control signal may include an amount of AC power output allocated to each of the determined number of the power electronics building blocks, wherein when the control power may be supplied to each of the determined number of the power electronics building blocks, each of the determined number of the power electronics building blocks outputs the allocated AC power amount.

The master controller may be configured to select the determined number of the power electronics building blocks among the plurality of power electronics building blocks.

The master controller may be configured to select the determined number of the power electronics building blocks, based on a lifespan state of each of the plurality of power electronics building blocks.

The master controller may be configured to select the determined number of the power electronics building blocks, based on a predetermined scheduling.

The master controller may be configured to transmit a turn-off signal to relay modules corresponding to remaining power electronics building blocks other than the selected power electronics building blocks.

The master controller may be configured to determine the number, based on the control command and a maximum efficiency of each of the power electronics building blocks.

The master controller may be configured to determine the number such that each of the determined number of the power electronics building blocks outputs a AC power value within a range of the AC power value in which each of the determined number of the power electronics building blocks achieve the maximum efficiency thereof.

Each of the plurality of the power electronics building blocks may include: a converter including plurality of insulated gate bipolar transistors (IGBTs); and a system controller to control an operation of the converter.

The master controller may be configured to transmit the control signal to each system controller included in each of the determined number of the power electronics building blocks.

The grid-connected inverter system may further include a main switched-mode power supply to supply power to the master controller, wherein when each relay module is turned on in response to reception of the turn-on signal, the main switched-mode power supply may supply power to each switched-mode power supply corresponding to each relay module.

The control command may include at least one of an amount of power required by the grid or solar radiation.

According to various embodiments of the present disclosure, power loss due to the standby state of the grid-connected inverter system may be reduced. Accordingly, a maintenance cost thereof may be reduced.

Further, performing individual parallel operation of the power electronics building blocks may result in improving an efficiency, extending a lifespan, reducing a maintenance cost, and improving product reliability.

DETAILED DESCRIPTION OF THE INVENTION

Hereinafter, exemplary embodiments disclosed in the present disclosure will be illustrated in detail with reference to the accompanying drawings. As used herein, a suffix "module" or "unit" as used for a component are intended only for ease of writing the present disclosure, and the suffix "module" or "unit" itself does not have a specific meaning or role.

Figure 1:
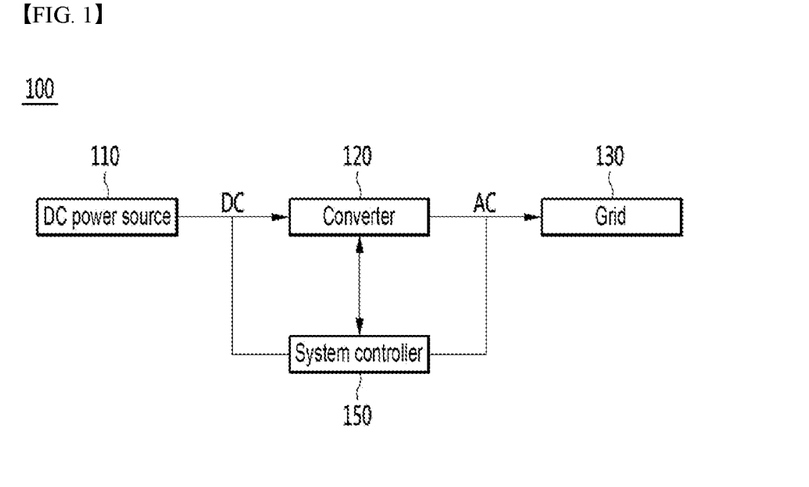
FIG. 1 is a diagram illustrating a configuration of a grid-connected inverter system according to an embodiment according to the present disclosure.

FIG. 1 is a diagram illustrating a configuration of a grid-connected inverter system according to an embodiment according to the present disclosure.

A grid-connected inverter system 100 may receive stable power from a renewable energy based generator.

The grid-connected inverter system 100 may supply excessive power to a grid 130 to efficiently utilize renewable energy.

Referring to FIG. 1, the grid-connected inverter system 100 according to a prior art includes a DC power source 110, a converter 120, the grid 130 and a system controller 150.

The DC power source 110 may deliver DC power to the converter.

The DC power source 110 may act as a source for managing renewable energy such as solar energy and wind energy.

In one embodiment, the DC power source 110 may include a battery.

In still another embodiment, the DC power source 110 may include battery-based energy storage.

The converter 120 may convert the DC power transferred from the DC power source 110 into AC power, and may transfer the converted AC power to the grid 130.

The grid 130 refers to power system in which a power plant, a substation, transmission and distribution lines, and a load are integrated with each other and thus power is generated and is consumed.

The grid 130 may consume the AC power transmitted from the converter 120.

The system controller 150 may control an overall operation of the grid-connected inverter system 100.

The system controller 150 may communicate with a higher controller that controls the grid-connected inverter system 100.

The system controller 150 may transmit a command received from the higher controller or a command generated by itself to the converter 120.

In one embodiment, the system controller 150 may transmit a command for controlling an operation of the converter 120 to output a certain AC power to the converter 120.

Figure 2:
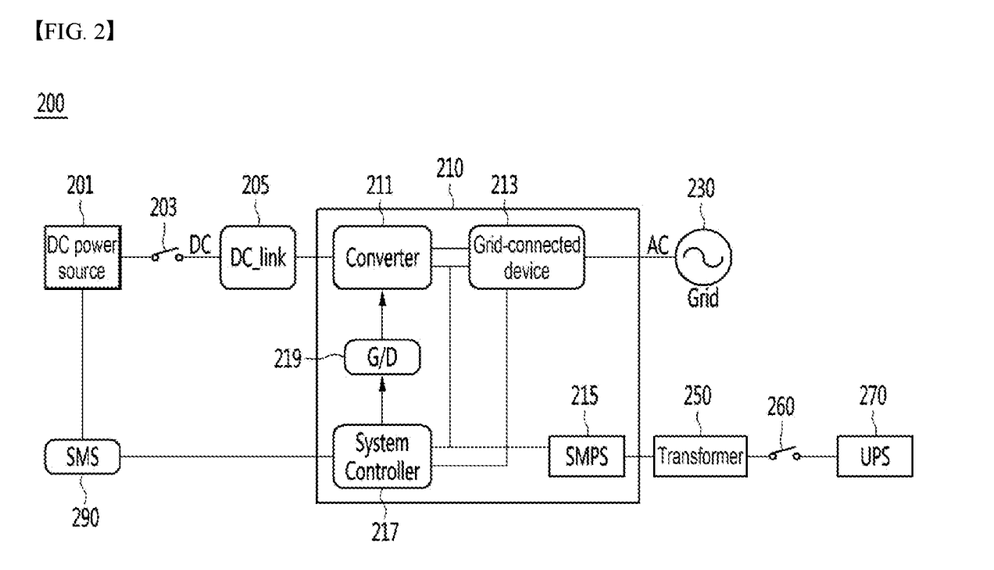
FIG. 2 is a configuration diagram illustrating a grid-connected inverter system according to another embodiment according to the present disclosure.

FIG. 2 is a configuration diagram illustrating a grid-connected inverter system according to another embodiment according to the present disclosure.

FIG. 2 is a diagram for illustrating a configuration of FIG. 1 in more detail.

Referring to FIG. 2, a grid-connected inverter system 200 includes a DC power source 201, a DC circuit-breaker 203, a DC link 205, a power electronics building block 210, a grid 230, a transformer 250, a cut-off switch 260, an uninterruptible power supply 270, and a source management system 290.

The DC power source 201 may output DC power.

The DC power source 201 may refer to a source for managing renewable energy such as solar energy and wind energy.

In one embodiment, the DC power source 201 may include a battery.

In another embodiment, the DC power source 201 may include battery-based energy storage.

When voltage or current abnormality occurs, the DC circuit-breaker 203 may disconnect the DC power source 201 from the power electronics building block 210. To this end, the DC circuit-breaker 203 may have a switch.

The DC link 205 may refer to a link that delivers the DC power output from the DC power source 201 to the power electronics building block 210.

The power electronics building block 210 may output AC power to be provided to the grid 230, according to a command received from the higher controller.

The power electronics building block 210 may include a converter 211, a grid-connected device 213, a switched-mode power supply (SMPS) 215, a system controller 217 and a gate driver 219.

The converter 211 may convert the DC power transmitted from the DC link 205 to AC power, based on a command received from the system controller 217.

The converter 211 may transfer the converted AC power to the grid 230.

The converter 211 may convert AC power transferred from the grid 230 to DC power, and then may supply the converted DC power to a battery (not shown). In this sense, the converter 211 may be referred to as a bidirectional converter.

The converter 211 may include a plurality of insulated gate bipolar transistors (IGBTs).

The grid-connected device 213 may include an AC filter for filtering the AC power, and an AC circuit breaker for cutting off the connection to the grid 230 when an abnormal state occurs.

In FIG. 2, the grid-connected device 213 is illustrated as being included in the power electronics building block 210. However, this is only an example. The grid-connected device 213 may be configured to be separate from the power electronics building block 210.

The switched-mode power supply (SMPS) 215 may supply power to at least one of the system controller 215 or the converter 211.

The switched-mode power supply 215 refers to an electronic power supply including a switching regulator that efficiently converts power.

The switched-mode power supply 215 may vary current or voltage characteristics of the power provided from the uninterruptible power supply 270. The switched-mode power supply 215 may provide power having varied current or voltage characteristics to at least one of the system controller 215 or the converter 211.

The system controller 217 may control an overall operation of the power electronics building block 210.

The system controller 217 may control an overall operation of the grid-connected inverter system 200.

The system controller 217 may receive a control command from the higher controller, and may control the operation of the converter 211 based on the control command.

In one embodiment, the control command may include a command for controlling the operation of the converter 211 to output the AC power required by the grid 230.

The gate driver 219 may transmit the control command received from the system controller 217 to the converter 211. The gate driver 219 may convert the control command into a pulse width modulation (PWM) signal, and transmit the converted pulse width modulation signal to the converter 211.

The grid 230 refers to power system in which a power plant, a substation, transmission and distribution lines, and a load are integrated with each other and thus power is generated and is consumed.

The transformer 250 may boost or lower the voltage provided from the uninterruptible power supply device 270, and may supply the boosted or lowered voltage to the switched-mode power supply 215.

The cut-off switch 260 may be configured for cutting off connection between the uninterruptible power supply 270 and the system controller 217 during abnormal operation of the grid-connected inverter system 200.

The uninterruptible power supply (UPS) 270 may provide the power to the switched-mode power supply 215 during a power outage event.

The uninterruptible power supply 270 may be configured for preventing deactivation of the grid-connected inverter system 20 in the power outage event. That is, the uninterruptible power supply 270 may be configured to cope with interruption of the power to be supplied to the switched-mode power device 215 during the power outage event.

The source management system (SMS) 290 may manage state information of the DC power source 201 in real time.

In one embodiment, when the DC power source 201 includes a battery, the state information of the DC power source 201 may include SOC (Stage of Charge) of the battery, and a temperature of the battery.

The grid-connected inverter system 200 shown in FIG. 2 may be configured to operate using a single power electronics building block 210.

This configuration may reduce power consumed by the power electronics building block 210 via a wake-up mode, in the standby mode when the power electronics building block 210 is not operating.

However, in order that the system controller 217 receives the command and immediately responds to the command even when the power electronics building block 210 is in the standby state, a certain amount of power must be supplied to the system controller 217. Thus, standby power may be lost.

In this connection, the standby power may refer to power consumed for the system controller 217 to immediately perform an operation according to the command when the converter 211 is in the standby state.

In still another embodiment according to the present disclosure, in order to minimize the consumption of the standby power, a method of supplying power to operate only some of the plurality of power electronics building blocks is proposed.

Figure 3:
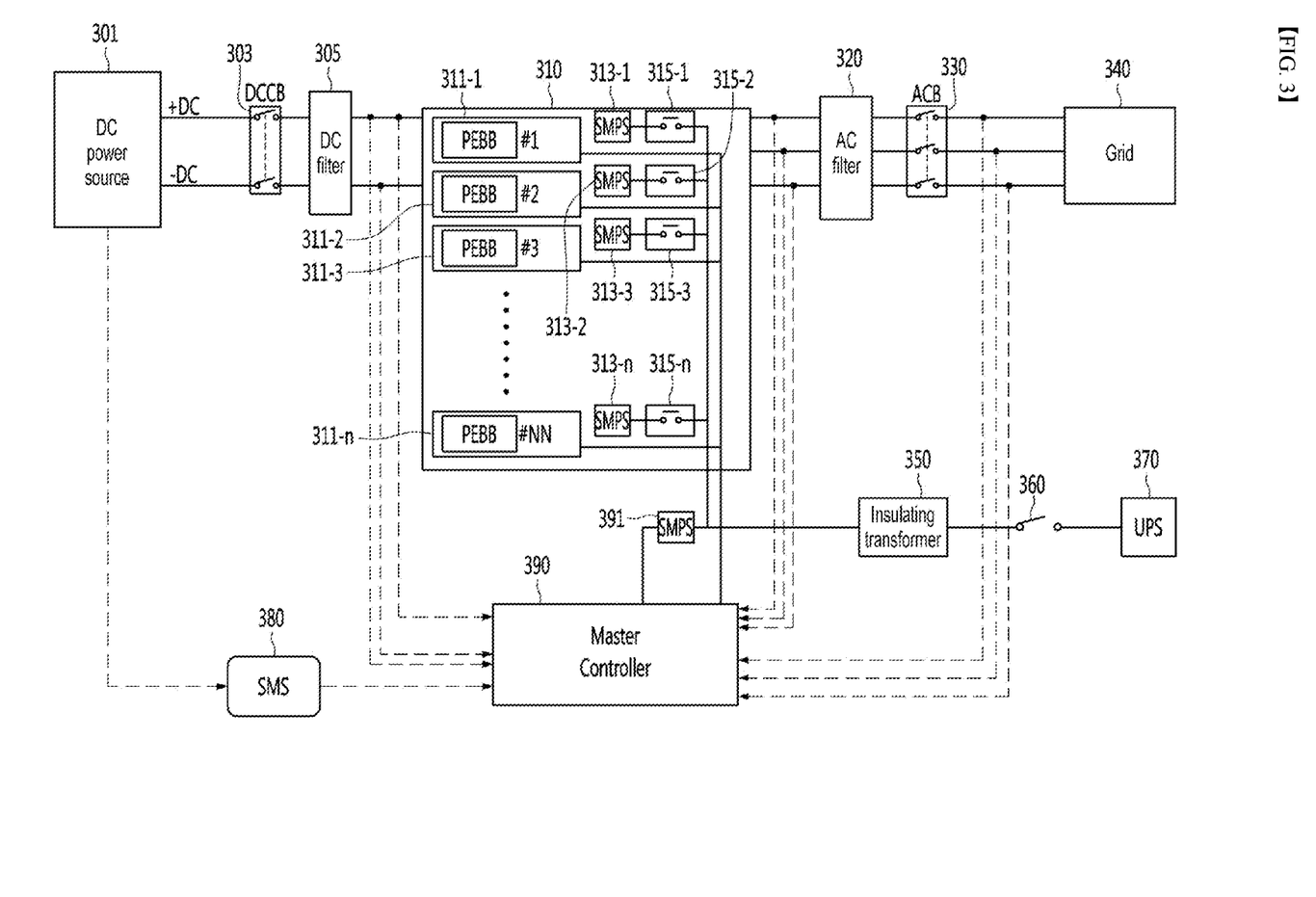
FIG. 3 is a diagram for illustrating a configuration of a grid-connected inverter system according to still another embodiment according to the present disclosure.

FIG. 3 is a diagram for illustrating a configuration of a grid-connected inverter system according to still another embodiment according to the present disclosure.

FIG. 3 is a grid-connected inverter system 300 for minimizing the consumption of standby power by connecting, in a parallel manner, the plurality of power electronics building blocks that may be operated independently.

Referring to FIG. 3, the grid-connected inverter system 300 may include a DC power source 301, a DC circuit-breaker 303, a DC filter 305, a power electronics building block group 310, an AC filter 320, an AC circuit-breaker 330, a grid 340, an insulating transformer 350, a cut-off switch 360, an uninterruptible power supply 370, a source management system 380, a master controller 390, and a main switched-mode power supply 391.

The DC power source 301 may output DC power.

The DC power source 301 may be configured for managing renewable energy such as solar energy and wind energy.

In one embodiment, the DC power source 301 may include a battery.

In another embodiment, the DC power source 301 may include battery-based energy storage.

When DC voltage or DC current abnormality occurs, the DC circuit-breaker 30 may disable connection between the DC power source 301 and the power electronics building block group 310. To this end, the DC circuit-breaker 303 may have a switch.

The DC filter 305 may be configured for removing noise of the DC power. The DC filter 305 may remove a ripple component of the DC current.

The power electronics building block group 310 may include a plurality of power electronics building blocks 311-1 to 311-n, a plurality of switched-mode power supplies 313-1 to 313-n, and a plurality of relay modules 315-1 to 315-n.

One power electronics building block, one switched-mode power supply and one relay module may constitute one set.

For example, a first power electronics building block 311-1, a first switched-mode power supply 313-1 and a first relay module 315-1 may be constitute a first set.

Each of the plurality of power electronics building blocks 311-1 to 311-n may include the converter 211, the system controller 217, and the gate driver 219 as illustrated in FIG. 2.

Each system controller 217 included in each of the plurality of the power electronics building blocks 311-1 to 311-n may allow independent control.

The plurality of power electronics building blocks 311-1 to 311-n may be connected to each other in parallel.

Each of the plurality of switched-mode power supplies 313-1 to 313-n may supply control power to a corresponding power electronics building block.

The plurality of relay modules 315-1 to 315-n may be turned on or off according to an on/off signal of the master controller 390.

When the relay module is turned on, the control power supplied from the main switched-mode power supply 391 may be delivered to the switched-mode power supply corresponding to the relay module.

When the relay module is turned off, the control power supplied from the main switched-mode power supply 391 may be prevented from being delivered to the switched-mode power supply corresponding to the relay module.

The AC filter 320 may remove noise of the AC power output from the power electronics building group 310.

When AC current or AC voltage abnormality occurs, the AC circuit-breaker 330 may disable AC power transmission between the power electronics building group 310 and the grid 340.

The grid 340 may consume the AC power received from the power electronics building block group 310.

The grid 340 may provide the AC power to the power electronics building block group 310.

The insulating transformer 350 may boost or lower the voltage provided from the uninterruptible power supply 370, and may deliver the boosted or lowered voltage to the main switched-mode power supply 391.

A reason why the insulating transformer 350 is present is that a rated voltage of the uninterruptible power supply 391 and a rated voltage of the main switched-mode power supply 391 may be different from each other.

The cut-off switch 360 may be configured to disable connection between the uninterruptible power supply 370 and the main switched-mode power supply 391 or the main controller 390 during an abnormal operation of the grid-connected inverter system 300.

In the power outage event, the uninterruptible power supply 370 may provide power to the main switched-mode power supply 391.

The uninterruptible power supply 370 may be configured for preventing deactivation of the grid-connected system 300 during the power outage event. That is, the uninterruptible power supply 370 may be configured to cope with interruption of the power to be supplied to the main switched-mode power device 391 during the power outage event.

The source management system 380 may manage state information of the DC power source 301 in real time.

In one embodiment, when the DC power source 301 includes a battery, the state information of the DC power source 301 may include a state of charge (SOC) of the battery, and a temperature of the battery.

The master controller 390 may control an overall operation of the grid-connected inverter system 300.

The master controller 390 may receive a control command from a higher controller.

The master controller 390 may determine the number of power electronics building blocks (PEBBs) to operate in the power electronics building block group according to the received control command.

The master controller 390 may select PEBBs corresponding to the determined number of PEBBs from the PEBB group.

The master controller 390 may transmit a turn-on signal for turning on each of the relay modules corresponding to the selected PEBBs or an off signal for turning off each of the relay modules corresponding to the selected PEBBs.

The master controller 390 may communicate with each system controller 217 included in each PEBB. The communication may be based on CAN (Controller Area Network) communication. This is only an example.

The master controller 390 may transmit a power amount signal including an amount of power to be output to each of the selected PEBBs.

The system controller 217 included in each of the selected PEBBs may control the operation of the converter 211 to output AC power of a corresponding amount according to the received power amount signal.

The main switched-mode power supply 391 may supply power required for the operations of the master controller 390, the DC circuit-breaker 303, and the AC circuit-breaker 330.

Further, the main switched-mode power supply 391 may supply power to a HMI (Human Machine Interface) (not shown) for an operator of the grid-connected inverter system 300.

Figure 4:
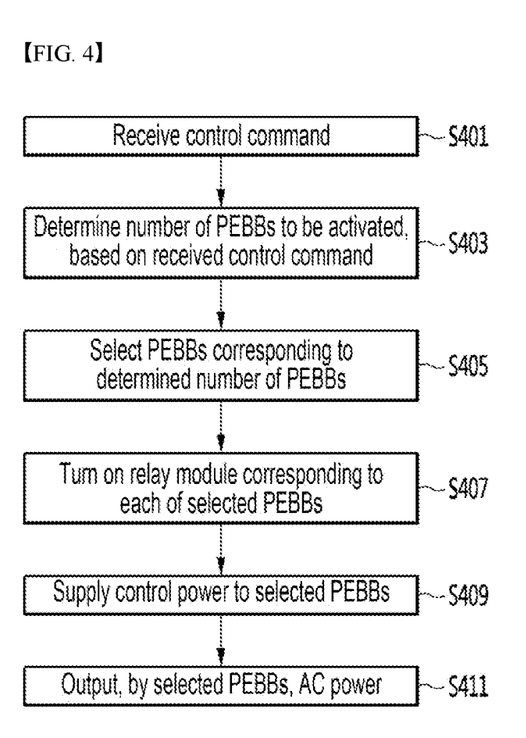
FIG. 4 is a flowchart illustrating an operation method of a grid-connected inverter system according to an embodiment according to the present disclosure.

FIG. 4 is a flowchart illustrating an operation method of a grid-connected inverter system according to an embodiment according to the present disclosure.

Hereinafter, FIG. 4 will be described in conjunction with FIG. 2 and FIG. 3.

Referring to FIG. 4, the master controller 390 receives the control command from the higher controller S401.

In one embodiment, the higher controller may be configured for controlling the operation of the grid-connected inverter system 300.

In one embodiment, the control command may be configured to indicate the grid 340 to output the required AC power. That is, the control command may include information about an amount of the AC power to be output by the power electronics building block 310.

The master controller 390 determines the number of PEBBs (power electronics building blocks) to be activated, based on the received control command S403.

The master controller 390 may determine the number of PEBBs to operate, in consideration of a maximum efficiency of the PEBB.

The maximum efficiency of the PEBB may mean an amount of power output therefrom versus a rated capacity of the PEBB.

For example, the PEBB maximum efficiency may occur in a range of 40% to 80% of the rated capacity. This will be illustrated with reference to FIG. 5.

Figure 5:
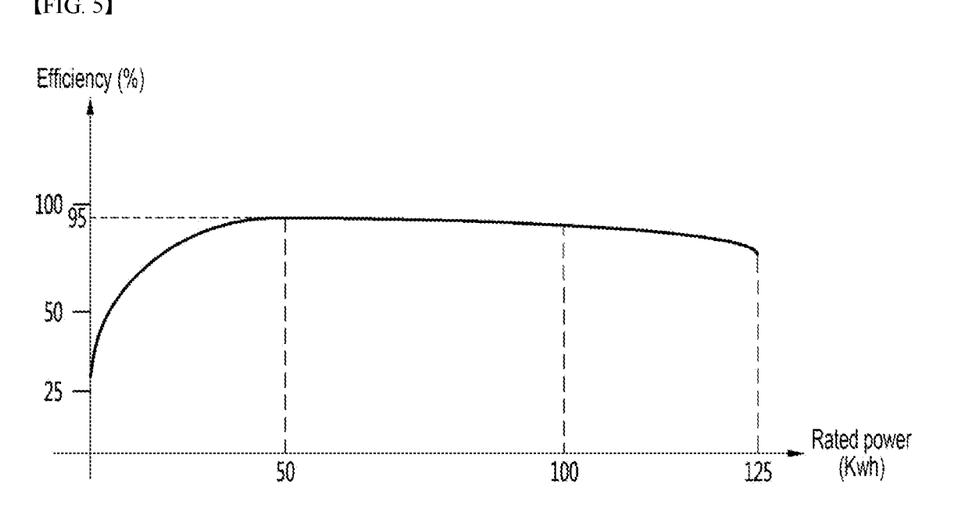
FIG. 5 is a graph showing efficiency of an output of a power electronics building block (PEBB) according to one embodiment according to the present disclosure.

FIG. 5 is a graph showing efficiency of an output of the power electronics building block according to one embodiment according to the present disclosure.

In FIG. 5, it is assumed that the rated capacity of each PEBB is 125 Kw. The rated capacity may indicate a maximum amount of power that PEBB is able to output.

FIG. 5 shows a graph of a power versus an efficiency that one PEBB may achieve. For example, when a PEBB having a rated capacity of 125 Kw outputs 95 Kw, the efficiency thereof may be 95%.

That is, the efficiency of 95% may refer to a case where the PEBB receives 100 Kw and outputs 95 kw.

Assuming that the maximum efficiency of the PEBB is 95%, the output of the PEBB needs to be determined within a range having the maximum efficiency of the PEBB.

In FIG. 5, it is indicated that when the PEBB outputs 50 to 100 Kw, the PEBB may achieve the maximum efficiency. This indicates that the PEBB may achieve the maximum efficiency in a range of approximately 40% to 80% of the rated capacity of the PEBB.

FIG. 4 is again described.

The master controller 390 may determine the number of PEBBs to be operated, based on the amount of power included in the control command and the maximum efficiency of the PEBB.

For example, when the amount of power to be provided to the grid 340 as included in the control command is 200 Kw, the master controller 390 may determine two PEBBs as the PEBBs to operate, with considering the maximum efficiency of the PEBBs.

That is, when each of the two PEBBs outputs 100 Kw of power, the amount of power to be provided to the grid 340 may be satisfied. As shown in FIG. 5, 100 Kw is within the range having the maximum efficiency of the PEBB. Thus, the master controller 390 may determine the number of PEBBs to be operated as two.

In still another embodiment, the master controller 390 may determine the number of PEBBs to operate, with considering a current situation of the grid 340. For example, as the amount of the power required by the grid 340 increases, the number of PEBBs to be activated increases. As the amount of the power required by the grid 340 decreases, the number of PEBBs to be operated may be reduced.

The current situation of the grid 340 may be included in the control command transmitted from the higher controller.

In still another embodiment, the master controller 390 may determine the number of PEBBs to be operated in consideration of solar radiation. For example, when the DC power source 301 is using solar energy to charge DC power therein, the master controller 390 increases the number of PEBBs to be operated as the amount of the solar radiation increases. As the amount of solar radiation decreases, the number of PEBBs to be operated may be reduced.

The solar radiation may be included in the control command transmitted from the higher controller.

The master controller 390 may select PEBBs corresponding to the determined number of PEBBs from the PEBB group S405.

In one embodiment, the master controller 390 may select two PEBBs, with considering a lifespan state of each of the plurality of PEBBs 311-1 to 311-n. For example, the master controller 390 may select one PEBB having the largest remaining lifespan and the other PEBB having the second largest remaining lifespan among the plurality of PEBBs 311-1 to 311-n.

The lifespan status of each PEBB may vary depending on a total operation time of each PEBB. That is, as the total operation time of each PEBB increases, the lifespan of each PEBB may decrease. The smaller the total operation time of the PEBB, the larger the remaining lifespan of the PEBB.

In still another embodiment, the master controller 390 may select two PEBBs among the plurality of PEBBs 311-1 to 311-n according to a predetermined scheduling. In this case, PEBBs to be operated may be pre-determined based on the number of PEBBs to be selected.

The master controller 390 transmits a turn-on signal to turn on each of the relay modules corresponding to the selected PEBBs.

In one embodiment, the master controller 390 may transmit the turn-on signal to each of the relay modules corresponding to the selected PEBBs over CAN (Controller Area Network).

Together with the turn-on signal, the master controller 390 may transmit a power amount signal including information on an amount of AC power that the corresponding PEBBs should output. The power amount signal may be transmitted to the system controller included in each of the selected PEBBs.

As the relay module turns on S407, each of the switched-mode power supplies corresponding to the selected PEBBs supplies control power to the corresponding PEBB S409.

Each of the corresponding PEBBs converts the DC power provided from the DC power source 301 into AC power and outputs the converted AC power S411.

The selected PEBBs may output the AC power required by the grid 340 as included in the control command received by the master controller 390. The output AC power may be provided to the grid 340.

Conventionally, in order to provide an amount of power required by the grid 340, each of all of n PEBBs has to output each power at a 1/n percentage of the total power amount required by the grid. Thus, it is inevitable to lose the standby power for the operation of the system controller included in each PEBB.

However, the grid-connected inverter system 300 according to an embodiment according to the present disclosure as illustrated in FIG. 4 may connect the plurality of independently-operated PEBBs with each other in a parallel manner and then selectively operate only some PEBBs that provide the amount of the power required by the grid 340

The PEBB to be operated may be determined according to the scheduling. Thus, control powers for the standby state of all PEBBs are not required. Rather, only some PEBB require the standby power. Thus, the loss of the standby power may be significantly reduced.

Next, FIG. 6 is a diagram illustrating an actual configuration of a power electronics building block according to an embodiment according to the present disclosure.

Figure 6A:
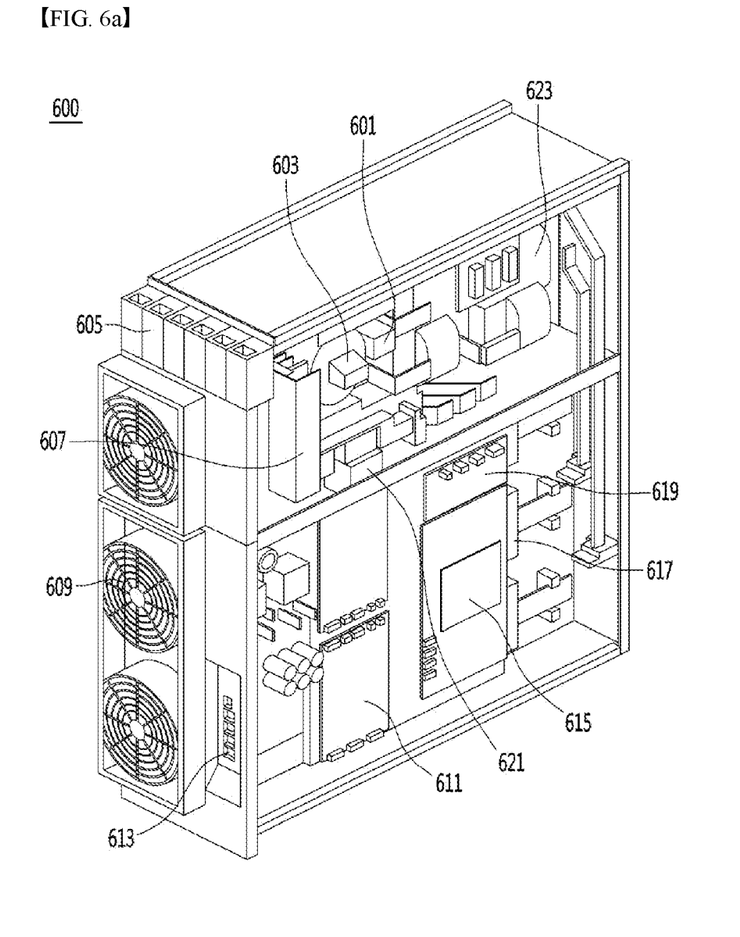
FIG. 6A is an internal configuration diagram of a power electronics building block according to an embodiment according to the present disclosure.
Figure 6B:
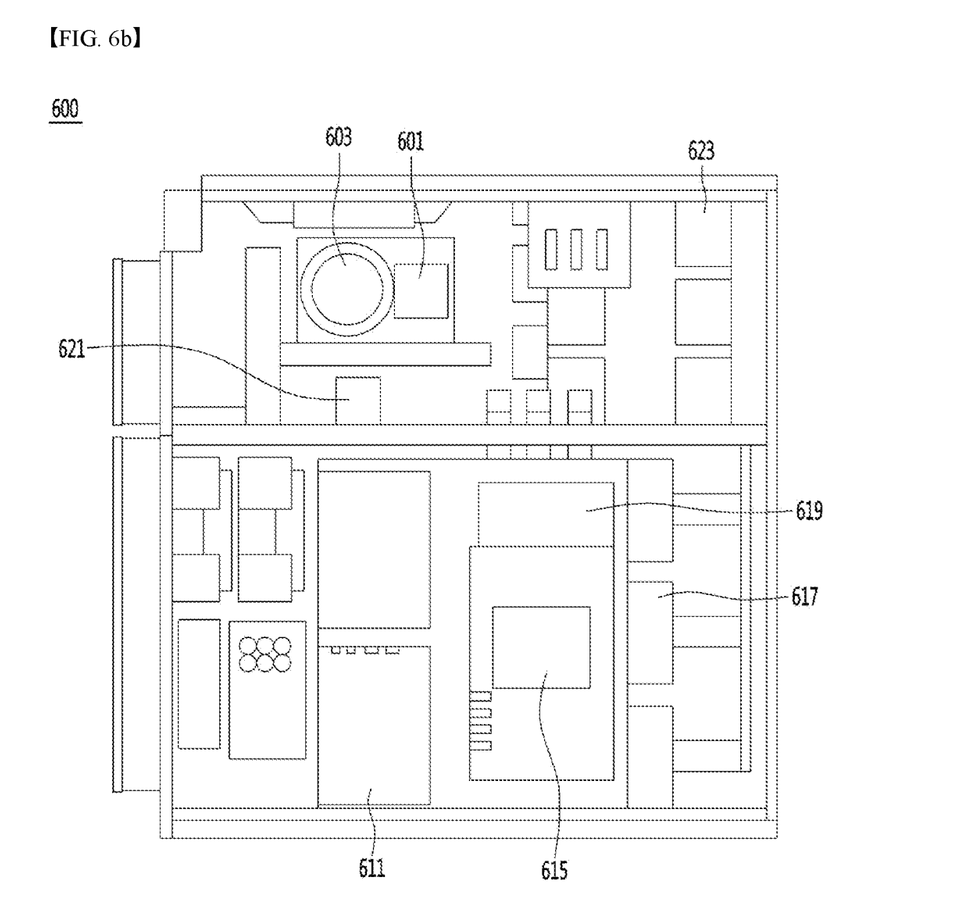
FIG. 6B is a side view of the power electronics building block according to an embodiment according to the present disclosure.
Figure 6C:
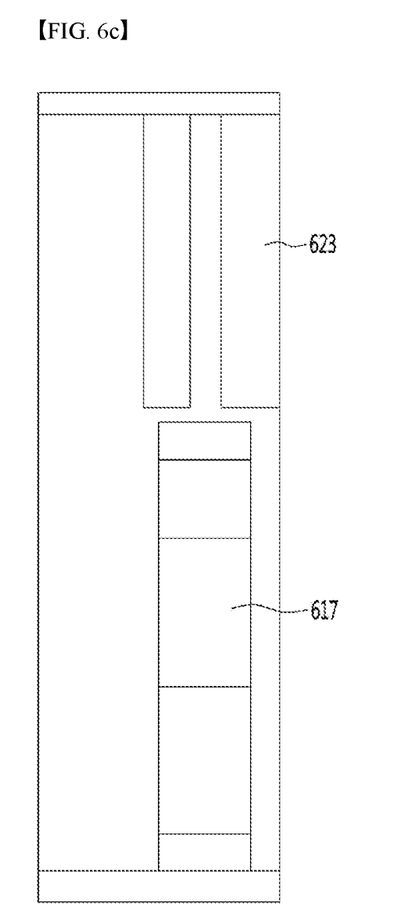
FIG. 6C is a rear view of the power electronics building block according to an embodiment according to the present disclosure.
Figure 6D:
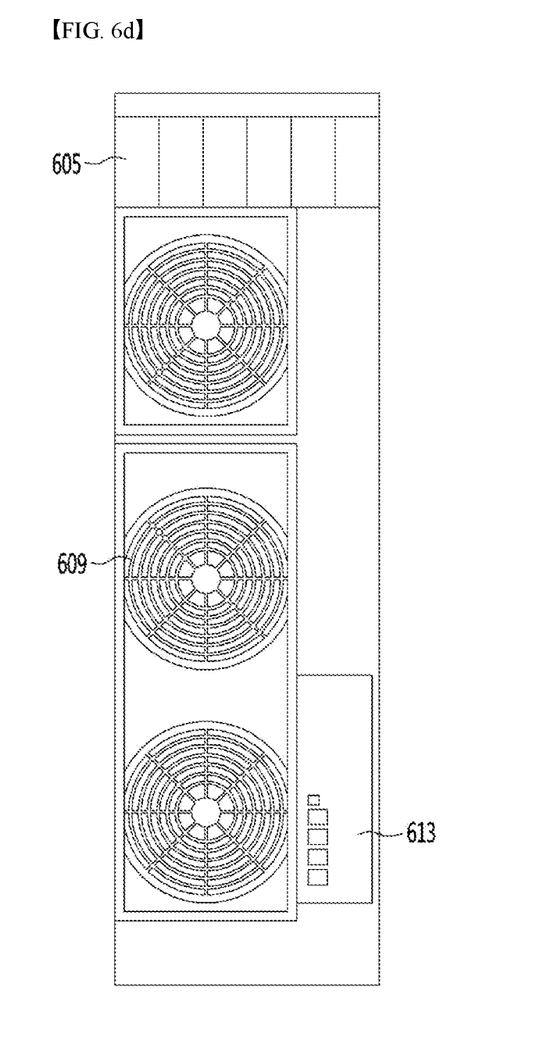
FIG. 6d is a front view of the power electronics building block according to an embodiment according to the present disclosure.

FIG. 6A is an internal configuration diagram of a power electronics building block according to an embodiment according to the present disclosure. FIG. 6B is a side view of the power electronics building block according to an embodiment according to the present disclosure. FIG. 6C is a rear view of the power electronics building block according to an embodiment according to the present disclosure. FIG. 6d is a front view of the power electronics building block according to an embodiment according to the present disclosure.

A power electronics building block 600 illustrated below corresponds to each of the plurality of power electronics building blocks 311-1 to 311-n as illustrated in FIG. 2 and FIG. 3.

Referring to FIG. 6A to FIG. 6D, the power electronics building block 600 according to an embodiment according to the present disclosure may include a current circuit-breaker 601, a filter capacitor 603, a terminal block 605, a fuse 607, a fan 609, SMPS 611, an interface terminal 613, a control board 615, an IGBT stack 617, a sensing board 619, a DC relay 621, and a filter reactor 623.

The current circuit-breaker 601 may be configured to prevent loss of reactive power of AC power. The current circuit-breaker 601 may be included in the AC circuit-breaker 330 of FIG. 3.

The filter capacitor 603 may remove noise of AC power. The filter capacitor 603 may be included in the AC filter 320 in FIG. 3.

The terminal block 605 may act as an interface for connection to the DC power source 301. The power electronics building block 600 may receive DC power via the terminal block 605.

When voltage or current abnormality occurs, the fuse 607 may disable connection between the DC power source 301 and the power electronics building block 600.

The fan 609 may cool down heat generated during operation of the power electronics building block 600 using wind.

The SMPS 611 may supply control power to the power electronics building block 600. The SMPS 611 may correspond to the switched-mode power supply 313-1 shown in FIG. 3.

The interface terminal 613 may be configured for communication with the master controller 390.

The control board 615 may include the system controller 217.

The IGBT stack 617 may correspond to the converter 211 and may include a plurality of IGBTs.

The sensing board 619 may detect state information of the power electronics building block 600.

The DC relay 621 may eliminate a circulating current that may occur in a process of connecting between the power electronics building blocks.

The filter reactor 623 may remove noise of the AC current. The filter reactor 623 may be included in the AC filter 320 in FIG. 3.

Figure 7:
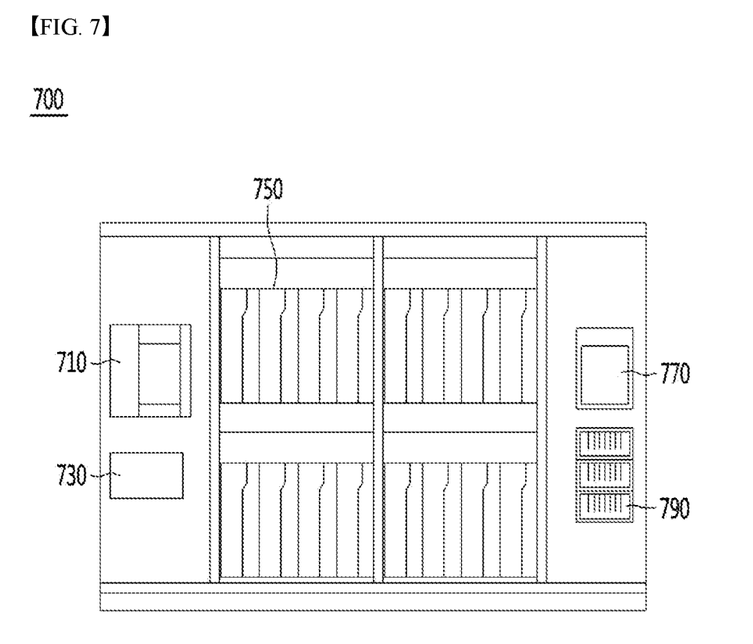
FIG. 7 is a diagram for illustrating an internal configuration of a power electronics building block group according to an embodiment according to the present disclosure.

FIG. 7 is a diagram for illustrating an internal configuration of a power electronics building block group according to an embodiment according to the present disclosure.

A power electronics building block group 700 illustrated in FIG. 7 may represent an actual internal configuration of the power electronics building group 300 in FIG. 3.

Referring to FIG. 7, the power electronics building block group 700 may include a DC circuit-breaker 710, a DC bus bar 730, a PEBB stack 750, an AC circuit-breaker 770, and an AC bus bar 790.

When DC voltage or DC current abnormality occurs, the DC circuit-breaker 710 may disable connection between the DC power source 301 as shown in FIG. 3 and the power electronics building block group 700.

The DC bus bar 730 may provide an interface for connecting the DC power source 301 and the power electronics building block group 700 with each other.

The PEBB stack 750 may include a plurality of PEBBs. The PEBB stack 750 may include 16 PEBBs.

When AC current or AC voltage abnormality occurs, the AC circuit-breaker 770 may disable AC power transmission between the power electronics building block group 700 and the grid 340.

The AC bus bar 790 may provide an interface for connection between the power electronics building block group 700 and the grid 340.

Features, structures, effects, etc. disclosed in the above embodiments are included in at least one embodiment of the present disclosure, and is not necessarily limited to one embodiment. Furthermore, features, structures, effects, etc. disclosed in each embodiment may be combined or modified with respect to other embodiments by a person having ordinary knowledge in the field to which the embodiments belong. Therefore, these combinations and variations should be interpreted as being included in the scope of the present disclosure.

The disclosure is set forth based on the embodiments. However, the embodiments are merely exemplary and do not limit the present disclosure. Those of ordinary skill in the field to which the present disclosure belongs will appreciate that various modifications and applications as not described above are possible without departing from the essential features of the embodiments. For example, each component specifically shown in the embodiment may be modified. These modifications and applications should be interpreted as being included in the scope of the present disclosure defined in the appended claims.

What is claimed is:

1. A grid-connected inverter system comprising:
a power electronics building block group including a plurality of power electronics building blocks, a plurality of switched-mode power supplies, and a plurality of relay modules corresponding to the plurality of power electronics building blocks,
wherein each power electronics building block is configured to convert direct current (DC) power supplied from a DC power source to alternating current (AC) power, and to supply the AC power to a grid;
a master controller configured to:
receive a control command from a higher controller,
determine a number of power electronics building blocks to be activated based on the control command, and
transmit a control signal triggering operations of the determined number of the power electronics building blocks thereto; and
a main switched-mode power supply to supply power to the master controller, wherein the main switched-mode power supply supplies power to each switched-mode power supply corresponding to each relay module.

2. The grid-connected inverter system of claim 1, wherein the plurality of power electronics building blocks are connected with each other in a parallel manner, wherein each of the plurality of power electronics building blocks is able to operate independently.

3. The grid-connected inverter system of claim 2, wherein the master controller is configured to transmit a turn-on signal to each of relay modules corresponding to the determined number of the power electronics building blocks, respectively.

4. The grid-connected inverter system of claim 3, wherein when each relay module is turned on in response to reception of the turn-on signal, each switched-mode power supply corresponding thereto supplies control power to each power electronics building block corresponding thereto.

5. The grid-connected inverter system of claim 4, wherein the control signal includes an amount of AC power output allocated to each of the determined number of the power electronics building blocks,
wherein when the control power is supplied to each of the determined number of the power electronics building blocks, each of the determined number of the power electronics building blocks outputs the allocated AC power amount.

6. The grid-connected inverter system of claim 3, wherein the master controller is configured to select the determined number of the power electronics building blocks among the plurality of power electronics building blocks.

7. The grid-connected inverter system of claim 6, wherein the master controller is configured to select the determined number of the power electronics building blocks, based on a lifespan state of each of the plurality of power electronics building blocks.

8. The grid-connected inverter system of claim 6, wherein the master controller is configured to select the determined number of the power electronics building blocks, based on a predetermined scheduling.

9. The grid-connected inverter system of claim 6, wherein the master controller is configured to transmit a turn-off signal to relay modules corresponding to remaining power electronics building blocks other than the selected power electronics building blocks.

10. The grid-connected inverter system of claim 3, wherein the main switched-mode power supply supplies power to each switched-mode power supply corresponding to each relay module when each relay module is turned on in response to reception of the turn-on signal.

11. The grid-connected inverter system of claim 1, wherein the master controller is configured to determine the number, based on the control command and a maximum efficiency of each of the power electronics building blocks.

12. The grid-connected inverter system of claim 11, wherein the master controller is configured to determine the number such that each of the determined number of the power electronics building blocks outputs a AC power value within a range of the AC power value in which each of the determined number of the power electronics building blocks achieve the maximum efficiency thereof.

13. The grid-connected inverter system of claim 1, wherein each of the plurality of the power electronics building blocks includes:
a converter including plurality of insulated gate bipolar transistors (IGBTs); and
a system controller to control an operation of the converter.

14. The grid-connected inverter system of claim 13, wherein the master controller is configured to transmit the control signal to each system controller included in each of the determined number of the power electronics building blocks.

15. The grid-connected inverter system of claim 1, wherein the control command includes at least one of: an amount of power required by the grid, or an amount of solar radiation.

* * * * *